(12) United States Patent
Satoh

(10) Patent No.: US 6,522,281 B2
(45) Date of Patent: Feb. 18, 2003

(54) ANALOG-DIGITAL CONVERSION SERVICE TRANSACTION SYSTEM AND METHOD THEREOF

(75) Inventor: Yutaka Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/915,787

(22) Filed: Jul. 26, 2001

(65) Prior Publication Data

US 2002/0059077 A1 May 16, 2002

(30) Foreign Application Priority Data

Aug. 17, 2000 (JP) ........................................ 2000-247557

(51) Int. Cl.⁷ ............................................... H03M 1/12
(52) U.S. Cl. ...................................................... 341/155
(58) Field of Search ................................. 341/155, 120, 341/126, 135, 144, 145, 166

(56) References Cited

U.S. PATENT DOCUMENTS 6,239,732 B1 * 5/2001 Cusey ......................... 341/155

FOREIGN PATENT DOCUMENTS

| JP | 10-269285 | 10/1998 |
|---|---|---|
| JP | 11-251909 | 9/1999 |

* cited by examiner

Primary Examiner—Brian Young
(74) Attorney, Agent, or Firm—Scully, Scott, Murphy & Presser

(57) ABSTRACT

An object of the present invention is to provide an analog-digital conversion service transaction system and a method thereof that can convert the analog information media into the digital information media without taking much trouble or costing much money. A distributor requested to convert analog information media into digital information media accesses to a converting center terminal by using a distributor terminal via a network, and transmits request order information to the converting center terminal. The conversion terminal, when receiving the request order information, calculates a time and date whereat the digital information media become available for a delivery, and transmits them to the distributor terminal. The client either receives the digital information media by visiting the distributor after the time and date whereat the transfer can be done, or receives the content of digital in formation media by an e-mail transmitted by the client terminal.

8 Claims, 6 Drawing Sheets

FIG.3

| | | |
|---|---|---|
| NAME OF CLIENT: | ADDRESS OF CLIENT: | |
| TELEPHONE NUMBER: | E-MAIL ADDRESS: | |

ANALOG MEDIA: ▶
- ■ VIDEO
- □ RECORD
- □ PHOTOGRAPH
- □

VOLUME: 1

DIGITAL MEDIA: ▶
- □ DVD
- □ CD
- ■ NETWORK
- □

VOLUME: 1

RETURNING METHOD OF ANALOG MEDIA: □ DISTRIBUTOR  ■ MAILING

[TRANSMIT ORDER]  [PRINT DEPOSIT RECEIPT]

DELIVERY TIME & DATE:

SERVICE FEE: ____ YEN

FIG.4

NAME OF CLIENT: ☐

ADDRESS OF CLIENT: ☐

TELEPHONE NUMBER: ☐

E-MAIL ADDRESS: ☐

ANALOG MEDIA: VIDEO ▶

DIGITAL MEDIA: NETWORK ▶

VOLUME: 1

VOLUME: 1

RETURNING METHOD OF ANALOG MEDIA: ☐ DISTRIBUTOR ■ MAILING

DELIVERY TIME & DATE: ☐

SERVICE FEE: ☐ YEN

[TRANSMIT ORDER]

[PRINT DEPOSIT RECEIPT]

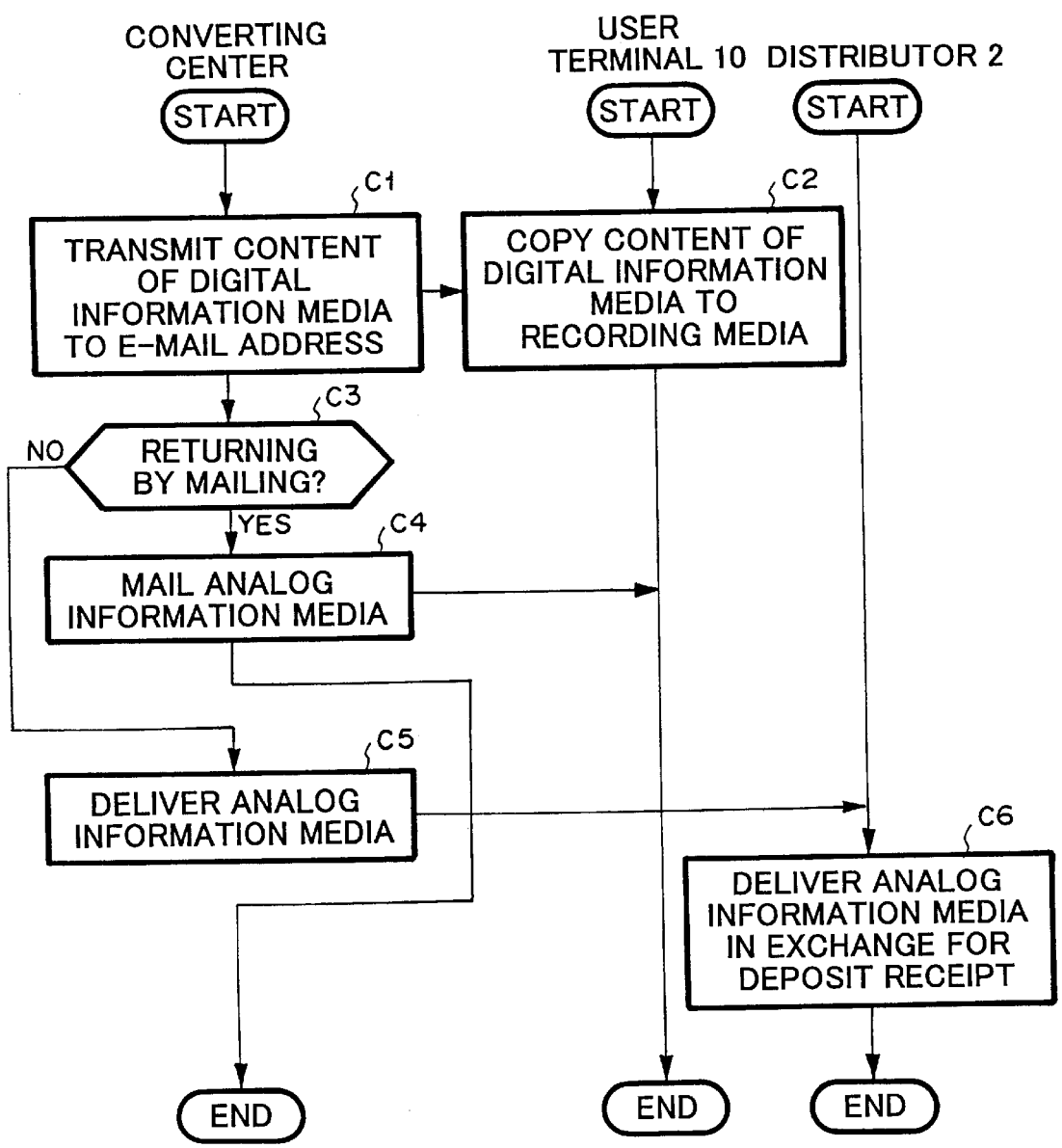

ANALOG-DIGITAL CONVERSION SERVICE TRANSACTION SYSTEM AND METHOD THEREOF

BACKGROUND OF THE INVENTION

1. Technical Field of the Invention

The present invent on relates to an analog-digital conversion service transaction system and method providing a service for converting analog information media such as cassette tapes or records into digital information media such as compact discs (CDs) or digital video (DVDs).

2. Description of the Prior Art

Since analog information media such as cassette tapes or records generally deteriorates, digital information media which are stronger against deterioration of information have currently been the mainstream. Moreover, it has been popular to reuse the analog information media saved as assets from the past by converting them into the digital information media.

However, there ha been a drawback that it takes extremely much trouble and costs extremely much money to purchase or rent analog-digital conversion equipment, and to implement analog-digital conversion by using the analog-digital conversion equipment in order to convert the analog information media i o the digital information media.

As described abode, there has been a disadvantage that it takes extremely much trouble and costs extremely much money to purchase or rent analog-digital conversion equipment, and to implement analog-digital conversion by using the analog-digital conversion equipment in order to convert the analog information media into the digital information media.

SUMMARY OF THE INVENTION

An object of the present invention is to provide an analog-digital conversion service transaction system and a method thereof that can convert the analog information media into the digital information media without taking much trouble or costing much money.

In order to overcome the above-described disadvantage, an analog-digital conversion service transaction system in the present invention comprises a distributor having the first terminal that can transmit via a network a request for a service converting analog information media into digital information media, and a converting center having the second terminal that can be connected to the network, and providing a service for converting the analog information media into the digital information media in the case where the second terminal receives the request.

In an analog-digital conversion service transaction system in the present invention, the distributor has the distributor terminal being connectable to the network, and the converting center has the converting center terminal being connectable to the network so that the distributor can request conversion of the analog information media into digital information media to the converting center via the network. Owing to this, the analog information media can be converted into the digital information media without taking much trouble or costing much money.

As described above, in the analog-digital conversion service transaction method in the present invention, the distributor has the distributor terminal being connectable to the network, and the converting center has the converting center terminal being connectable to the network so that the distributor can request conversion o the analog information media into the digital information media to the converting center via the network. Therefore, it becomes possible to convert the analog information media into the digital information media without taking much trouble or costing much money.

BRIEF EXPLANATION OF THE DRAWINGS

FIG. 3 is a drawing showing an example of a request order page displayed on a screen of a distributor terminal;

FIG. 4 is a drawing showing an example of the request order page displayed on the screen of the distributor terminal whereon a time and date of transfer is displayed;

FIG. 6 is a sequence diagram showing the analog-digital conversion service transaction method in the preferred embodiment of the present invention in the case where transfer by e-mail is designated as the transfer method.

PREFERRED EMBODIMENT OF THE INVENTION

Figure 1:
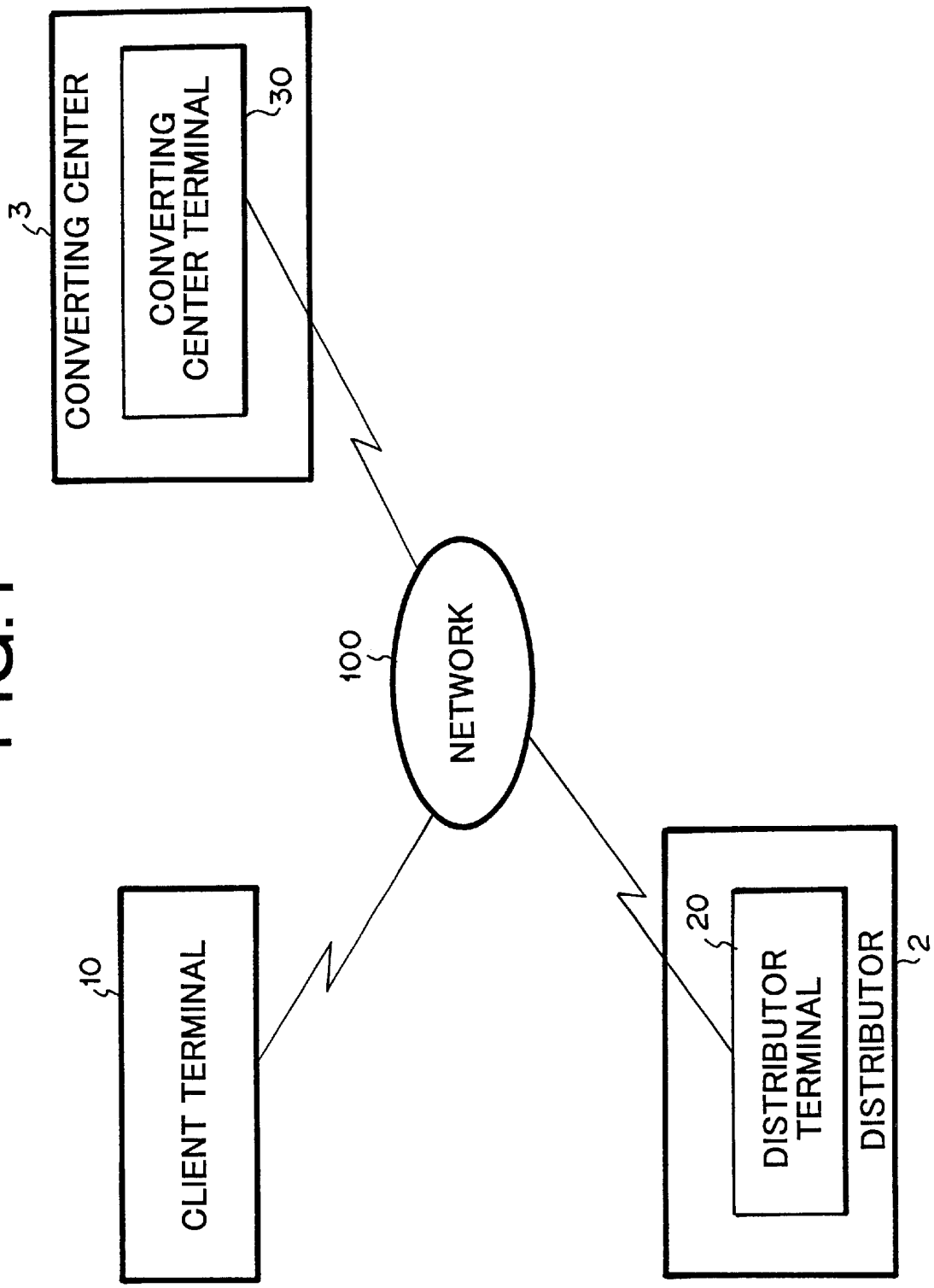
FIG. 1 is a block diagram showing a structure of an analog-digital conversion service transaction system in a preferred embodiment of the present invention.

Next, a detailed explanation will be given of an analog-digital conversion service transaction system and a method thereof in a preferred embodiment of the present invention with reference to accompanied drawings. FIG. 1 is a block diagram showing a basic structure of the analog-digital conversion service transaction system in this embodiment The analog-digital conversion service transaction system in this embodiment is composed of a client terminal 10, a distributor 2, a converting center 3, and a network 100 such as the Internet. The distributor 2 has a distributor terminal 20 being connectable to the network 100, and accepts a request of the analog-digital conversion. The converting center 3 has a converting center terminal 30 being connectable to the network 100, and gives a service of converting the analog information media into the digital information media.

The client terminal 10 is an information processor such as a personal computer or a mobile terminal. The client terminal 10 has a function for receiving e-mails and a function for receiving and storing the digital information media attached to the e-mails transmitted via the network 100.

The distributor terminal 20 is an information processor such as a personal computer or a mobile terminal. The distributor terminal 20 has a function for transmitting input request order information to the converting center terminal 30 via the network 100. Tie request order information includes information relating to a client such as the client's name, address, contact address, or e-mail address, information relating to a kind a d volume of the analog information media being an object of the conversion, and information relating to a kind of the digital information media requested by the client and to a method of transferring them. The distributor terminal 20 further has a function for receiving information of a time and date Whereat the converted digital information media become available for transfer, and rate information via the network 100.

The converting center terminal 30 is an information processor such as a personal computer or a mobile terminal. The converting center terminal 30 has a function for recording the information of a request order for the analog-digital conversion that is transmitted via the network 100. Moreover, the converting center terminal 30 has a function for calculating the time and date whereat the digital information media become available for transfer by calculating a time required for the analog-digital conversion and adding a time required for delivery to the calculated time. The converting center terminal 30 also has a function for transmitting the time and date whereat the digital information media become available for transfer to the distributor terminal 20, and a function for transmitting the digital information media to the client terminal 10 via the network 100.

Figure 2:
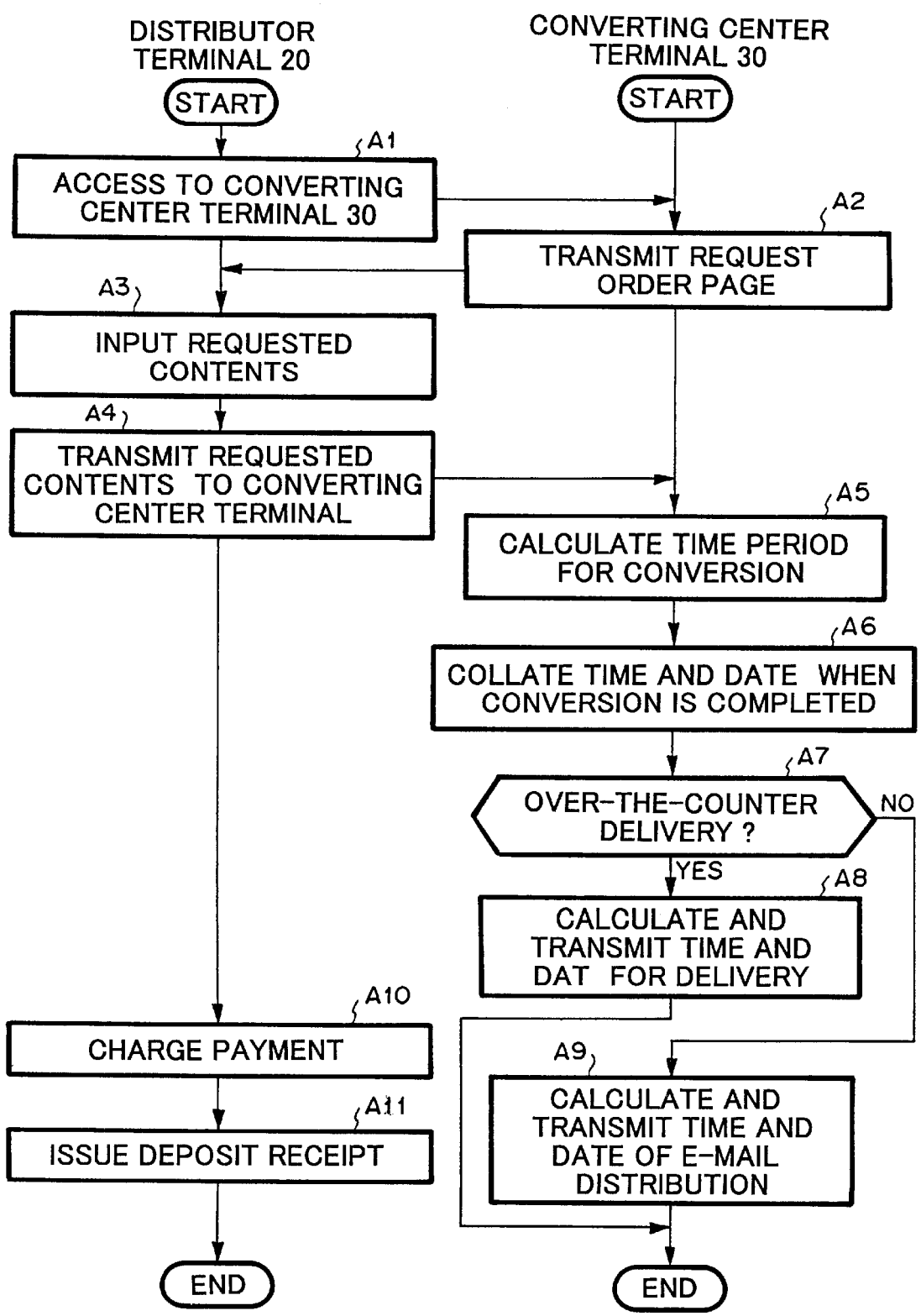
FIG. 2 is a sequence diagram showing an analog-digital conversion service transaction method in a preferred embodiment of the present invention.

Next, an explanation will be given of an analog-digital conversion service transaction method in this embodiment with reference to the accompanied drawings. FIG. 2 is a sequence diagram showing the analog-digital conversion service transaction method of this embodiment. When the client intending to convert the analog information media into the digital information media visits the distributor 2, a salesclerk of the distributor accesses to the converting center terminal 30 by using the distributor terminal 20 via the network 100 (a step A1). Responding to this, the converting center terminal 30 transmits a request order page for the analog-digital conversion to the distributor terminal 20 (a step A2). Then, the request order page is displayed on a screen of the distributor terminal. The distributor terminal may store the transmitted request order page at this point.

FIG. 3 is a drawing showing an example of the request order page displayed on the screen of the distributor terminal 20. As shown in FIG. 3, the request order page includes entry columns for the respective items such as a client's name, address, phone number, and e-mail address, a kind and volume and a returning method of the analog information media, or a kind and volume of the digital information media. The entry columns are designed so that data of the respective items can be inputted. The salesclerk of the distributor obtains the information on the order from the client, inputs the required items to those entry columns, and then, clicks an order transmission button (a step A3). When the order transmission button is clicked, the contents of the respective inputted items are transmitted to the converting center terminal 30 as request order information (2 step A4).

When the request order information is received, the converting center terminal 30 calculates the time required for the analog-digital conversion process on the basis of the requested contents (a step A5), collates the time to a conversion process schedule managed at the converting center terminal 30, and calculates the time and date whereat the analog-digital conversion process will be completed (a step A6).

Next, the converting center terminal 30 checks whether or not an over-the-counter transfer at the distributor 2 is designated as the method of transferring the digital information media in the request order information (a step A7). In the case where it turns out that the over-the-counter transfer at the distributor 2 is designated at the step A7, the time and date whereat the digital information media become available for transfer are calculated by adding the time required for delivery to the distributor to the time required for the above-mentioned analog-digital conversion process, and the time and date are transmitted to the distributor terminal 20 with the rate information (a step A8).

In the case when the transfer by e-mail is designated as the method of the transfer, the time and date whereat the digital information media become available for transmission are calculated and are transmitted to the distributor terminal 20 with the rate information (a step A9). After the step A8 or A9, in the columns for the time and date whereat the transfer can be done land for the conversion service rate on the request order page displayed on the distributor terminal 20, the calculated time and date and the rate are displayed as shown in FIG. 4. The client pays the price of the displayed rate to the salesclerk of the distributor, and the salesclerk of the distributor clicks a print deposit receipt button on the request order page and hands an outputted deposit receipt to the client (a step A10).

Figure 5:
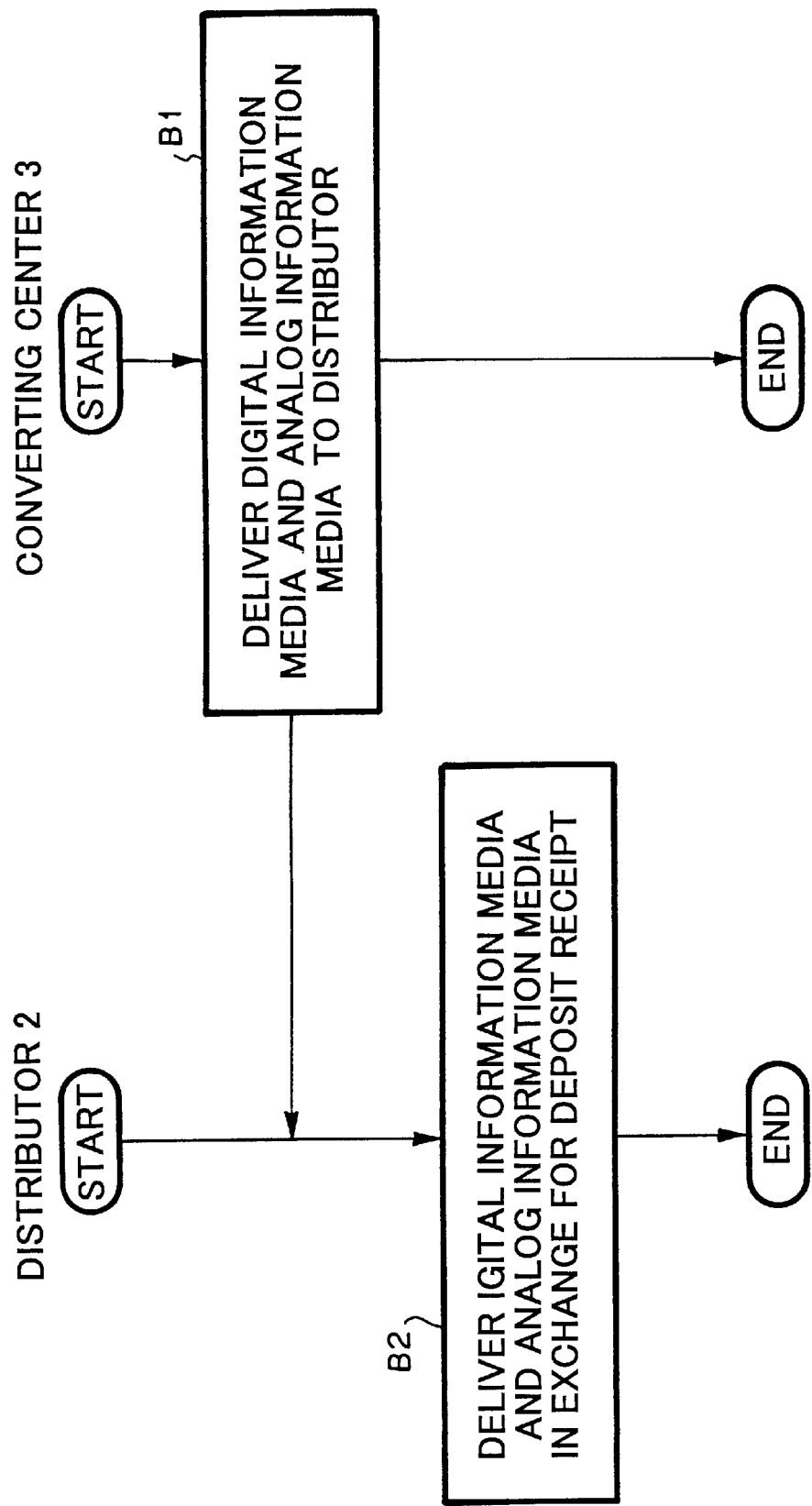
FIG. 5 is a sequence diagram showing the analog-digital conversion service j transaction method in the preferred embodiment of thy present invention in the case where over-the-counter transfer at the distributor is designated as a transfer method.

FIG. 5 is a sequence diagram showing the analog-digital conversion service transaction method in this embodiment in the case where the over-the-counter transfer at the distributor 2 is designated as the transferring method. The converting center terminal 30 delivers the formed digital information media and the original analog information media to the distributor after the analog-digital conversion process is finished (a step B1). At the distributor 2, the digital information media and the analog information media are transferred to the client in exchange for the deposit receipt when the client visits the distributor (a step B2).

FIG. 6 is a sequence diagram showing the analog-digital conversion service transaction method in this embodiment in the case where the transfer by e-mail is designated as the method of the transfer. The converting center terminal 30 transmits the formed digital information media to the e-mail address of the client terminal 10 included in the request order information when the analog-digital conversion process is finished (a step C1). The client terminal 10 receiving the digital information media copies the digital information media to recording media on hand (a step C2). The converting center terminal 30 checks whether or not mailing is designated as the returning method of the analog information media (a step C3).

The converting center terminal 30 mails the analog information media directly to the client in the case where the mailing is designated as the returning method of the analog information media (a step C4), and delivers the analog information media to the distributor 2 in the case where the delivery to the distributor 2 is designated as the returning method of the analog information media (a step C5). The distributor 2 transfers the analog information media to the client in exchange for the deposit receipt when the client visits the distributor (a step C6).

As described above, in the analog-digital conversion service transaction method! in this embodiment, the distributor 2 has the distributor terminal 20 being connectable to the network 100, and the converting center 3 has the converting center terminal 30 being connectable to the network 100 so that the distributor 2 can request conversion of the analog information media into the digital information media to the converting center 3 via the network 100. Owing to this, it becomes possible to convert the analog information media into the digital information media without taking much trouble or costing much money.

What is claimed is:

1. An analog-digital conversion service transaction system comprising;
   a distributor having a first terminal that can transmit via a network a request order for a service of converting analog information media into digital information media; and a converting center having a second terminal that can be connected to said network, and can convert said analog information media into said digital information media according to the request order, when said second terminal receives the request order.

2. The analog-digital conversion service transaction system according to claim 1, wherein said second terminal, when said request order is received, calculates a time and date when said digital information media are delivered and transmits said time and date to said first terminal.

3. The analog-digital conversion service transaction system according to claim 1, wherein, in the case where said request order designates a delivery of said digital information media, said converting center delivers said digital information media to said distributor, and said distributor delivers said digital information media in exchange for a deposit receipt given to a client at the time of said request order.

4. The analog-digital conversion service transaction system according to claim 1, wherein, in tie case where said request order designates a delivery of said digital information media by an e-mail, said converting center transmits said digital information media to an e-mail address designated by said request order.

5. An analog-digital conversion service transaction method comprising the steps of:

transmitting, when a service of converting analog information media into digital information media is requited, a request order comprising requested content that at least designates a method of delivery of said digital information media, through a network from a distributor to a second terminal included in a converting center for converting said analog information media into said digital information media, by using a first terminal included in said distributor, converting by using said converting center said analog information media into said digital information media on the basis of the request order received by said second terminal; and delivering by using said converting center said digital information media on the basis of the method designated by said request order.

6. The analog-digital conversion service transaction method according to claim 5, which further comprises the steps of:

calculating by using said converting center a time and date when said digital information media are delivered, in the case where said request order is received; and transmitting said time and date to said first terminal.

7. The analog-digital conversion service transaction method according to claim 5, which further comprises the steps of:

delivering by using said converting center said digital information media to said distributor, when said request order designates a delivery of said digital information media at said distributor; and and delivering by using said distributor said digital information media in exchange for a deposit receipt given to a client at the time of said request order.

8. The analog-digital conversion service transaction method according to claim 5, which further comprises the step of:

transmitting by using said converting center said digital information media to an e-mail address designated by said request order, when said request order designates e-mail as a method of delivering said digital information media.

* * * * *